(12) United States Patent
McGowan

(10) Patent No.: US 10,102,089 B2
(45) Date of Patent: Oct. 16, 2018

(54) INPUT/OUTPUT (I/O) DEVICE CONFIGURATION SIGNATURE

(71) Applicant: Intel Corporation, Santa Clara, CA (US)

(72) Inventor: Steven McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 285 days.

(21) Appl. No.: 14/573,091

(22) Filed: Dec. 17, 2014

(65) Prior Publication Data

US 2016/0179556 A1  Jun. 23, 2016

(51) Int. Cl.
| | |
|---|---|
| *G06F 11/22* | (2006.01) |
| *G06F 21/44* | (2013.01) |
| *G06F 11/30* | (2006.01) |
| *G06F 21/73* | (2013.01) |
| *G06F 13/10* | (2006.01) |
| *G06F 13/40* | (2006.01) |

(52) U.S. Cl.
CPC ...... *G06F 11/2247* (2013.01); *G06F 11/3051* (2013.01); *G06F 13/10* (2013.01); *G06F 21/44* (2013.01); *G06F 21/73* (2013.01); *G06F 13/4068* (2013.01)

(58) Field of Classification Search
CPC ........ G06F 13/10; G06F 13/102; G06F 11/22; G06F 11/2247; G06F 11/30; G06F 11/3051; G06F 21/44; G06F 21/50; G06F 21/70; G06F 21/71; G06F 21/73; G06F 21/82; G06F 21/83; G06F 21/84; G06F 21/85; G06F 21/88; G06F 9/4411; G06F 9/4413; G06F 9/4415
See application file for complete search history.

(56) References Cited

U.S. PATENT DOCUMENTS

| | | | | |
|---|---|---|---|---|
| 8,230,149 B1* | 7/2012 | Long | ...................... | G06F 13/12 710/305 |
| 8,281,058 B1* | 10/2012 | McCorkendale | ..... | G06F 13/102 710/104 |
| 8,819,828 B1* | 8/2014 | Umland | .................. | G06F 21/55 726/23 |
| 8,862,803 B2* | 10/2014 | Powers | ................. | G06F 13/385 710/306 |
| 9,386,024 B1* | 7/2016 | Zaitsev | ................. | H04L 63/145 |
| 2006/0143716 A1* | 6/2006 | Ikemoto | .................. | G06F 21/57 726/27 |
| 2013/0014221 A1* | 1/2013 | Moore | .................... | G06F 21/85 726/3 |
| 2014/0068704 A1* | 3/2014 | Grewal | ............... | H04L 63/0428 726/1 |

OTHER PUBLICATIONS

"Universal Serial Bus 3.1 Specification". Revision 1.0. Jul. 26, 2013. Hewlett-Packard Company, et al. Chapters 9.5-9.7. pp. 9-35- 9-60.*

* cited by examiner

Primary Examiner — Thomas J Cleary
(74) Attorney, Agent, or Firm — International IP Law Group, P.L.L.C.

(57) ABSTRACT

A method for building a configuration signature for an input/output (I/O) device is described herein. The configuration signature is built based on descriptors of an I/O device and save to a host after an initial connection. After the initial connection, the I/O device may be subjected to modifications. To determine if such modifications exist, the descriptors of the I/O device are compared to the configuration signature after the initial connection.

23 Claims, 6 Drawing Sheets

200

400

INPUT/OUTPUT (I/O) DEVICE CONFIGURATION SIGNATURE

TECHNICAL FIELD

The present disclosure relates generally to techniques for indicating a modification to an input/output (I/O) device. More specifically, the present techniques relate to building a configuration signature used to determine if the I/O device has been modified.

BACKGROUND ART

An input/output (I/O) device may support the Downloadable Firmware Update (DFU) I/O device Class or a vendor defined mechanism, which defines a protocol for sending new firmware updates to the device. In embodiments, the DFU generically refers to a mechanism that allows the firmware of an I/O device to be updated, irrespective of whether the USB DFU Device Class, a vendor defined, or other method is used. Vendors may take advantage of the DFU Device Class or a vendor-defined mechanism to update the I/O device when firmware bugs are found, class-specific protocols are changed, and features are added, among other firmware updates. In some cases, a I/O device may be reprogrammed during a firmware update to harm a system. For example, the firmware update can alter descriptors of the I/O device to cause the I/O device to appear as the original device plus a new device.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
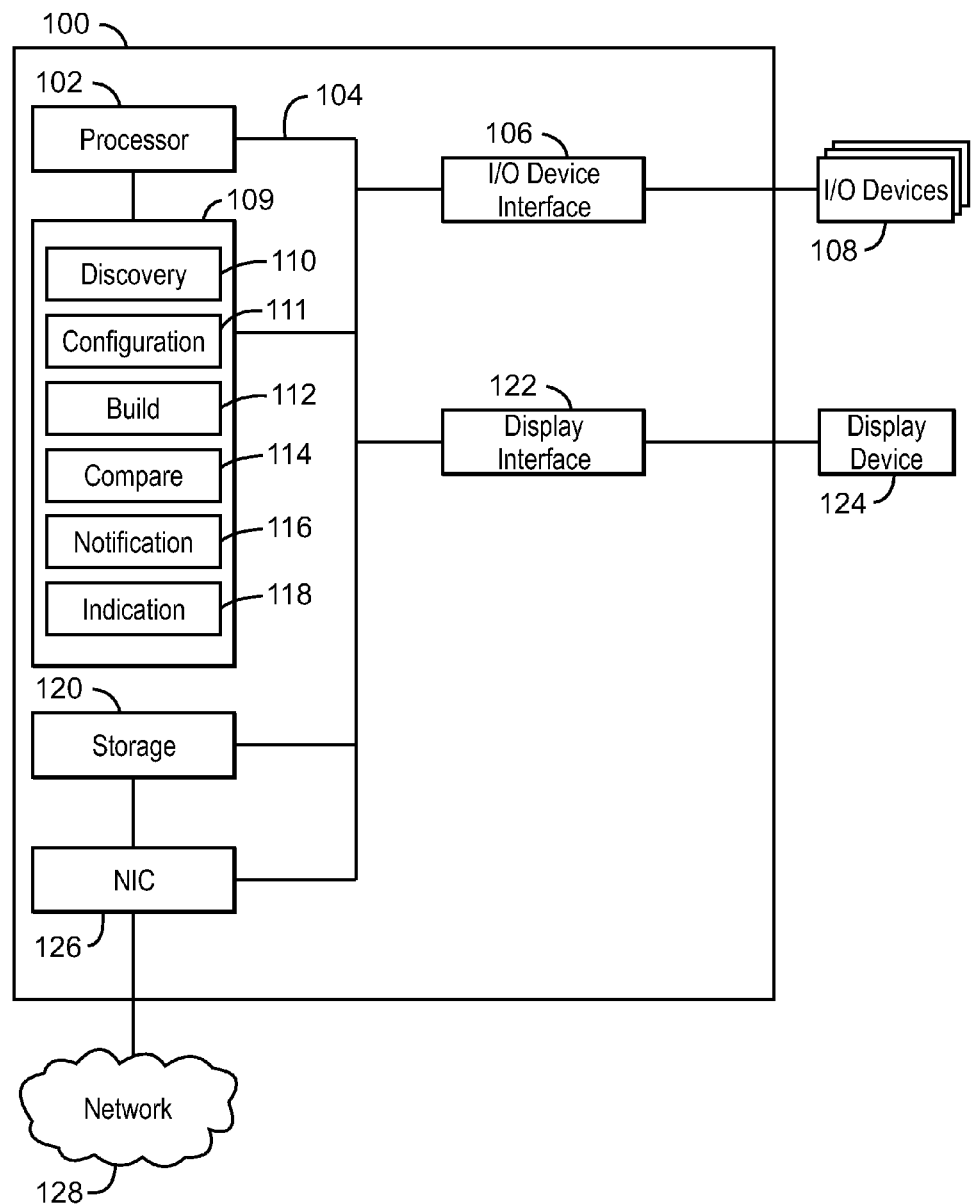
FIG. 1 is a block diagram of an example host that can build a configuration signature based on descriptors.

An input/output (I/O) device, such as Universal Serial Devices (USB) device, includes a plurality of descriptors that provide information to a host to indicate, among other things, what the device is, who makes the device, what particular protocols the device supports, how the device can be configured, the number of endpoints supported by the device, among other information related to the I/O device. When an I/O device is first connected with a host, the I/O device is a trusted device and thus, the host reads the descriptors with no additional validation done to the I/O device on subsequent connections to the host.

The Downloadable Firmware Update (DFU) I/O device class enables firmware of the I/O device to be updated in a vendor and device independent manner. Often, the firmware update may include an update to the descriptors of the I/O device. When malicious software is included in the firmware update, the I/O device may be attacked by being reprogrammed to modify its descriptors to harm the host. An example of such an attack involves re-programming the I/O device to "look" like the original I/O device plus a new device when connected to the host. This change may result in the I/O device exposing its legacy interface as well as a new interface to the host. For example, the I/O device may expose a legacy interface, such as a storage interface of a DVD drive, as well as a new interface, such as a human interface device (HID) keyboard interface when the descriptors have been altered. In such a scenario, the keyboard interface may be used to inject malicious commands into the host by the I/O device that was previously a storage device according to its descriptors, and considered safe. Once the I/O device is connected with the host, malicious operations may be performed on the host to steal protected data, delete data, or add software not authorized by the user.

The present techniques disclose a configuration signature used to discover if modifications have been made to an I/O device each time it is connected to a host. Specifically, in the following embodiments, a method of building the configuration signature and comparing the configuration signature to descriptors of the I/O device to indicate the status of the I/O device after an initial connection to the host is described herein.

In the following description, numerous specific details are set forth, such as examples of specific types system configurations, specific instruction types, specific system components, etc. in order to provide a thorough understanding of the present invention. It will be apparent, however, to one skilled in the art that these specific details need not be employed to practice the present invention. In other instances, well-known components or methods, such as specific and alternative system configurations, specific instruction types, specific system components have not been described in detail in order to avoid unnecessarily obscuring the present invention.

Although the following embodiments may be described with reference to I/O devices, other embodiments are applicable to other types of input/output devices. Similar techniques and teachings of embodiments described herein may be applied to other types of input/output devices that may also benefit from protection from malicious attacks. For example, the disclosed embodiments may include Bluetooth devices, D-ROM drive, a SCSI hard drive, and an autochanger. Further, the host may include desktop computer systems, devices, tablets, other thin notebooks, systems on a chip (SOC) devices, hand-held devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus, methods, and systems described herein are not limited to physical computing devices, but may also relate to software optimizations for energy conservation and efficiency.

FIG. 1 is a block diagram of an example host 100 that can build a configuration signature based on descriptors. The host 100 may be, for example, a laptop computer, a desktop computer, or a tablet computer, among others. The host 100 includes a processor 102 that is adapted to execute stored instructions. The processor 102 can be a single core processor, a multi-core processor, a computing cluster, or any number of other configurations.

The processor 102 may be connected through a system bus 104 (e.g., PCI®, PCI-Express®, HyperTransport®, NuBus, etc.) to an input/output (I/O) device interface 106 adapted to connect the host 100 to one or more I/O devices 108. The I/O devices 108 may include, for example, a USB keyboard, a USB mouse device, USB speakers, among others. The I/O devices 108 may be built-in components of the host 100, or may be devices that are externally connected to the host 100. An I/O device 108 that is externally connected to the host 100 may use a cable to electrically connect to the host 100 via ports of the host 100.

The processor 102 may be connected through the system bus 104 to a memory device 109 that stores the instructions that are executable by the processor 102. The memory device 109 can include random access memory, read only memory, flash memory, or any other suitable memory systems. The instructions that are executed by the processor 102 may be used to discover the I/O device 108 when initially connected to the host 100, when a connection is re-established with the host 100 after a power-down operation or failure, thus, resulting in a boot process, and when re-connected, i.e., subsequent connection, to the host 100. In some embodiments, the memory device 109 may include a discovery block 110, a configure block 111, a build block 112, a comparison block 114, a notification block 116, and an indication block 118.

After the I/O device 108 is initially connected or remains connected during a boot process, the discovery block 110 is activated and the host 100 accesses the ports of the system bus 104 to determine which I/O device interfaces 106 are attached. Additionally, during a subsequent connection, i.e., Hot-Plugged, of the I/O device 108 to the host 100, the discovery block 110 discovers the subsequently connected I/O device 108. Accordingly, the detection of the I/O interface 106 or the I/O device 108 triggers the discovery block 110, where the host 100 reads in the descriptors of the device 108 to determine the attributes and capabilities of the I/O device interface 106 and the I/O device 108. Thereafter, the configuration block 111 of the memory device 109 configures the I/O device 108 by loading the appropriate driver to the device 108. During the initial connection, the discovery block 110 reads descriptors (e.g., device descriptors, configuration descriptors) of the I/O device 108 and a build block 112 builds a device signature, i.e., a configuration signature, based on the descriptors of the I/O device 108. The configuration signature is saved and compared against descriptors of the I/O device 108 during subsequent connections.

During the subsequent connection of the I/O device 108 to the host 100, the comparison block 114 may then compare the latest descriptors to the configuration signature formed when the I/O device 108 is initially connected to the host 100. In particular, the comparison block 114 compares the descriptors read during the subsequent connection to the static configuration signature to determine if a modification of the I/O device 108 has occurred since the initial connection. In some cases, the modification may include reprogramming or altering the I/O device 108 to include malicious files or commands, or other types of malicious programs. In some embodiments, if a modification has occurred, the notification block 116 may generate a notification in response to the modification of the I/O device 108. In some embodiments, the indication block 118 may provide a user with an indication to either accept or decline the modification. Additionally, in some embodiments, the I/O device 108 may be quarantined in response to the modified descriptors.

The processor 102 may be connected through the system bus 104 to a storage device 120. The storage device 120 is a physical memory such as a hard drive, an optical drive, a flash drive, an array of drives, or any combinations thereof. The storage device 120 can store the signatures created by the build block 112, along with other types of user data. The storage device 120 can also store programming code such as I/O device drivers, software applications, operating systems, and the like. The programming code stored to the storage device 120 may be executed by the processor 102 or any other processors that may be included in the host 100.

The processor 102 may also be linked through the system bus 104 to a display interface 122 adapted to connect the host 100 to a display device 124. The display device 124 may be an internal component or an external component of the host 100 and includes a display screen that can be built-in or externally connected. For example, the display device 124 may include a computer monitor, television, or projector, among others, that are connected to the host 100 via the display interface 122.

In addition, a network interface controller (NIC) 126 may be adapted to connect the host 100 through the system bus 104 to a network 128. The network 128 may be a cellular network, a radio network, a wide area network (WAN), a local area network (LAN), or the Internet, among others.

The block diagram of FIG. 1 is not intended to indicate that the host 100 is to include all of the components shown in FIG. 1. Rather, the computing system 100 can include fewer or additional components not illustrated in FIG. 1 (e.g., additional processors, memory devices, storage devices, network interfaces, etc.). The host 100 may include any number of additional components not shown in FIG. 1, depending on the details of the specific implementation.

Figure 2:
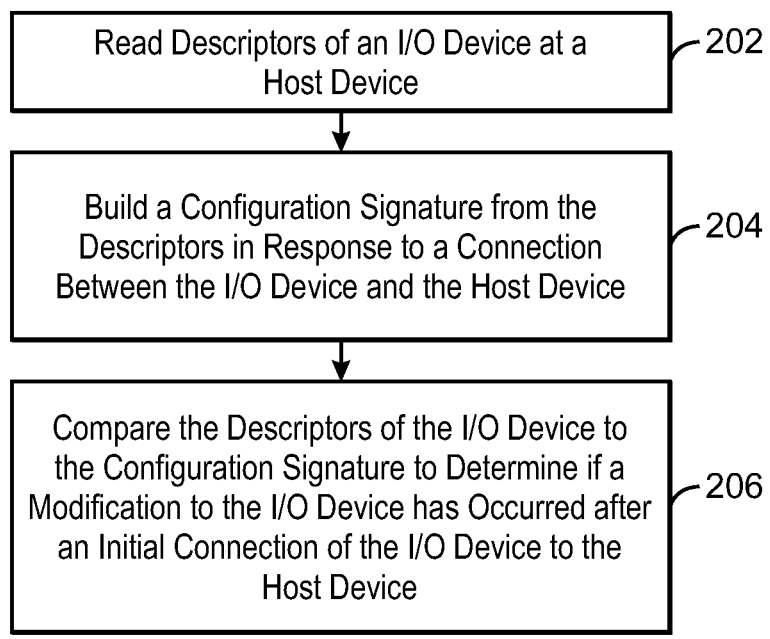
FIG. 2 is a process flow diagram of an example method for indicating a change to an I/O device.

FIG. 2 is a process flow diagram of an example method 200 for indicating a change to an I/O device. The method 200 can be implemented with the host 100 of FIG. 1. Accordingly, like numbered items are as described with respect to FIG. 1. In embodiments, an indication that the functionality exposed by the I/O device has changed provides user attestation of whether the firmware of the I/O device has been altered by a third party that is not an original manufacturer of the firmware. The change in the functionality of the firmware may be legitimate, for example, in the case of a firmware change incorporated by the original manufacturer or a user. Additionally, the change may be malicious in nature so as to include malware or other malicious code in the firmware.

An I/O device 108, such as a USB device or a vendor-defined device, may electrically connect to a host 100. In some examples, the I/O device 108 may include mass storage class devices such as hard drives, flash memory readers, digitals cameras, among others. In some embodiments, the I/O device 108 may include audio class devices, video class devices, and communication class devices, among others. Further, the I/O device 108 may include a human interface device (HID) class, such as a USB keyboard, a USB mouse, or USB game controllers, among others.

The I/O device 108 includes information about its characteristics in the form of data structures, i.e., descriptors. The descriptors include device descriptors, configuration descriptors, string descriptors, interface descriptors, class-specific descriptors, vendor-specific descriptors, and endpoint descriptors, among other types of descriptors described by the I/O Device Class and USB 3.1 Specifications. For example, the device descriptors include information about an I/O device as a whole, including a particular device class of the I/O device and the product and vendor identification numbers associated with the I/O device. Further, in some examples, the configuration descriptors indicate a series of interfaces used to expose the capabilities of the I/O device 108. For instance, the configuration descriptors may provide the amount of power a particular configuration utilizes or the number of interfaces associated with the descriptor.

After the I/O device 108 is initially connected to the host 100, the host 100 receives a message indicating that a new device is attached. In order to understand its capabilities, e.g., the maximum amount of data the I/O device can send, at block 202, the host 100 reads descriptors associated with the I/O device 108 during the discovery process.

At block 204, the descriptors may be used by the host 100 to build a configuration signature in response to the connection between the I/O device 108 and the host 100. As previously discussed, the descriptors include various types of descriptors including configuration descriptors, which contain information related to the configuration of the I/O device and its interfaces. The descriptors may also include endpoint descriptors, class specific descriptors, and vendor specific descriptors, among others. The configuration signature may include a power-up feature, status setting, a class specific setting, among other types of settings specific to the I/O device.

An algorithm may use the descriptors to build a configuration signature hash-tag or a configuration signature checksum. In general, the set of descriptors used by the algorithm provide the configuration signature. Thus, the quality of the configuration signature depends on the number and types of descriptors that comprise it, as well as the accuracy of the compression algorithm if one is used. The configuration signature provides static information about the I/O device 108 that does not change. The configuration signature could be stored as a direct image of the descriptors read from the device in memory or an algorithm could be used to store a compressed form of the configuration signature, for example, a checksum or hash value algorithm. Additionally, the configuration signature could be storages as multiple sub-signatures in a storage location or memory. The sub-signatures may be formed from subsets of the descriptors or states of the I/O device 108, or a combination of both. In some examples, the states of the I/O device 108 may include a power-up feature, a status setting, a class specific setting, among other types of settings specific to the I/O device 108.

Since the configuration signature includes static information, it can be used to determine if modifications have been made to I/O device 108 during a subsequent discovery of the device 108. For example, the I/O device 108 may be disconnected from the host 100 at the discretion of the user or while the host 100 is powered down. Upon a subsequent connection of the I/O device 108 to the host 100, the I/O device 108 may be checked for modifications in an effort to not compromise the security of the host 100. Specifically, at block 206, the descriptors of the subsequently connected I/O device 108 may be compared to the configuration signature to determine if a modification to the I/O device 108 has occurred since its initial connection. In particular, if the descriptors associated with the subsequent connection differ from the configuration signature, which is based on the static information of the descriptors associated with the initial connection, this may suggest that the I/O device 108 has been modified.

The present techniques use the configuration signature to guard against malicious attacks on the host 100 in the event that the I/O device 108 has been modified to include malicious code. For example, the I/O device 108 may be modified to masquerade as a different kind of device (e.g., a spoofed keyboard). When connected, the I/O device 108, acting as the spoofed keyboard, can be used to imitate keyboards presses that command the download and execution of the malicious code onto the host 100. As a result, the host 100 is now infected with malicious content that may take control of the host 100 or the I/O device 108, misappropriate data, or spy on the habits of the user, among other actions. To add, when additional I/O devices 108 are attached to the host 100, such malicious code could also reprogram and modify those I/O devices 108 and infect the host 100, as well.

It is understood that the system of FIG. 2 is for illustrative purposes only. The components of FIG. 2 may include any suitable number of additional operations or may include fewer operations depending on the particular application.

Figure 3A:
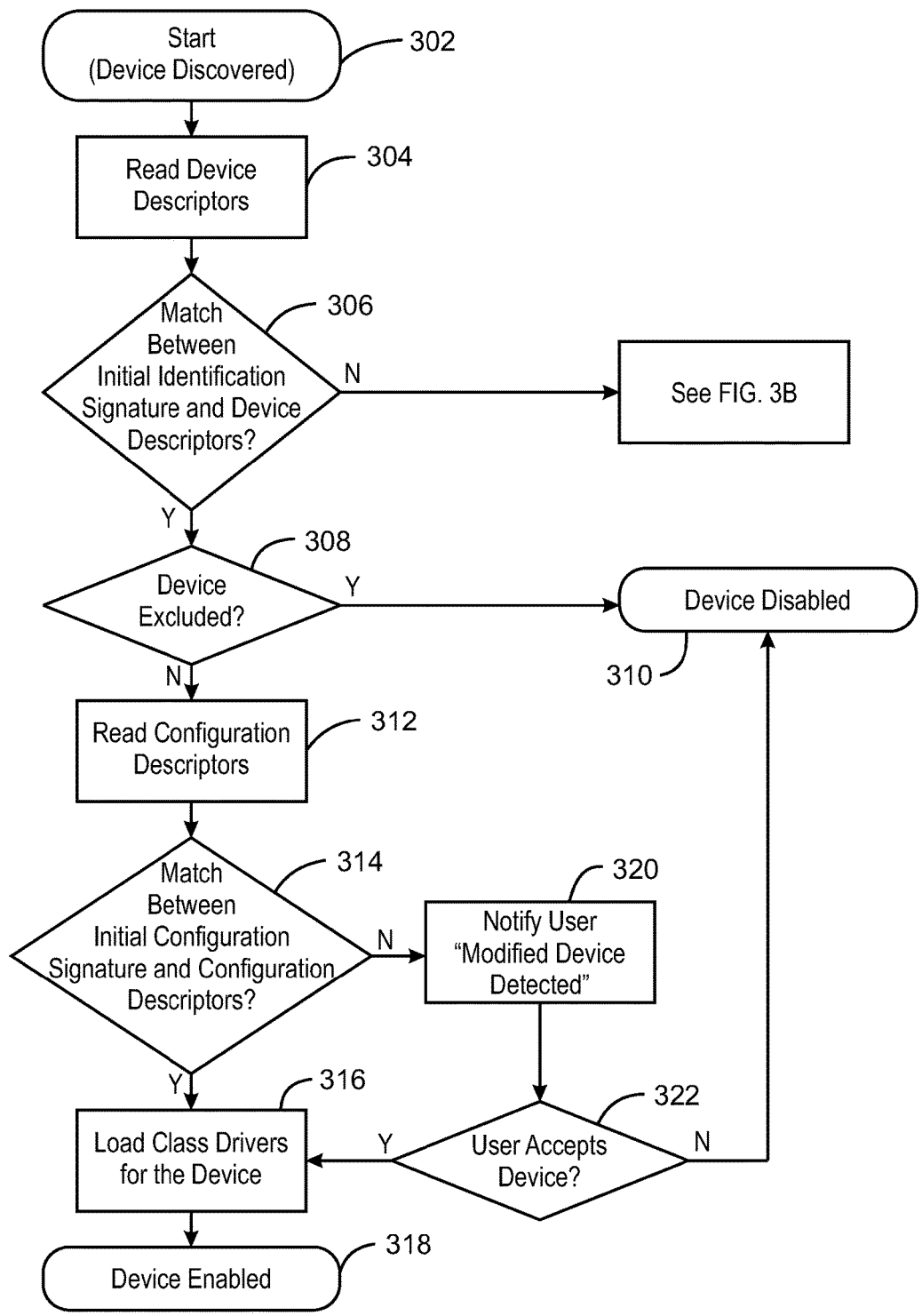
FIG. 3A is an embodiment of a process flow diagram to indicate a status of an I/O device.

FIG. 3A is an embodiment of a process flow diagram 300A to indicate a status of an I/O device. Upon an initial connection of the I/O device, the host builds an identification signature and a configuration signature and saves both signatures. During subsequent I/O connections of the same I/O device, the host will use the identification signature to recognize whether the I/O device has been previously attached to the host. Furthermore, the host will use the configuration signature to determine whether the I/O device has been modified since its initial connection.

At block 302, an I/O device is discovered. In embodiments, discovery of the I/O device includes the host recognizing that the I/O device is plugged into one of its input/output ports. The host begins to inquire into the details of the I/O device including the types of descriptors associated with the device. At block 304, the host reads device descriptors of the I/O device.

As previously discussed, the I/O device includes device class descriptors, for example mass storage class devices, communication class devices, among others. An I/O Device Class Specification defines class-specific descriptors that may be exposed by the I/O device. In some examples, the I/O device may include human interface device (HID) class descriptors, such as for keyboard or pointing devices, used to control the operation of the host. The HID class-specific descriptors differ from the device descriptors of a mass storage, communication, or other class devices. In particular, the host may read HID descriptors that specify the number, type, and size of the HID descriptors and physical descriptors associated with the HID. Additionally, the host may read class-specific descriptors, for example HID report descriptors used to provide the particular content and format of report data fields of the HID that the host can use. In the case of a USB device, the USB Specification defines a set of standard descriptors that may be exposed by the USB specification. Additionally, USB device vendors may define proprietary descriptors.

At block 306, the host determines if the identification signature matches the device descriptors read at block 304. An identification signature, as described herein, includes static information, such as vendor identification or device identification that may be used to identify the I/O device. In an example where the device descriptors read at block 304 match the identification signature, the host will recognize the I/O device as a previously attached device. If the device descriptors read at block 304 do not match the identification signature, at block 306, this may indicate that the I/O device is a newly connected device, as will be discussed further with respect to FIG. 3B.

At block 308, the host determines if the I/O device is an excluded device, if the identification signature matches the device descriptors. Specifically, a list of excluded devices may be stored on the operating system of the host where the list includes devices known to be susceptible to malicious programs, or devices that have been deemed harmful by the user or other trusted entity. A host hardware or software vendor may provide the list of excluded devices, which can include a list of known malicious device signatures. Additionally, the user may construct the list of excluded devices based on known malicious code information. The list of excluded devices may be updated on a regularly basis based on collected information provided by the vendor, the user, or both. In examples, the list of excluded devices may be stored locally or in a cloud, with a portion of the list cached locally.

At block 310, if the I/O device is determined to be an excluded device, it may be disabled and rendered non-operational on the host. In some embodiments, the user may manually disable the I/O device or the operating system of the host may automatically disable the I/O device based on the list of excluded devices. In embodiments, the user may have the option to enable the disabled I/O device based on user discretion.

At block 312, if the connected I/O device is not an excluded device, the host may read the configuration descriptors of the subsequently connected I/O device using a get configuration request. The get configuration request to the I/O device returns a hierarchy of descriptors that describe the device. A configuration descriptor is followed by one or more interface descriptors. An interface descriptor is followed by one or more endpoint descriptors. Class specific, vendor specific, and other standard I/O descriptors may be included in the set of descriptors returned for a configuration, where the I/O device may support multiple configurations or alternate interface settings within a configuration. Each configuration descriptor uniquely identifies itself with a configuration number, and identifies the number of interfaces that it supports. Each interface descriptor uniquely identifies itself with an interface number and alternate setting value, and identifies the number of endpoints that it supports.

A simple configuration signature generation algorithm may only extract the device and configuration descriptors from a device to build an initial configuration signature. A more intelligent algorithm may extract class specific, vendor specific descriptors, or other information from a device to generate the initial configuration signature. For example, of a HID descriptor is detected in the configuration descriptor set, a more comprehensive signature algorithm may include the HID report descriptor in its configuration signature.

In the present embodiments, the configuration signature is used as a comparison mechanism during subsequent connections of the I/O device to determine whether a modification to the I/O device has occurred after its connection. At block 314, the initial configuration signature is compared with the current configuration signature, which is computed from the descriptors and other information read at block 312 to determine if there is a match. In embodiments, the match may include similarities or consistencies that coincide with the characteristics of both the configuration signature and the configuration descriptors. For example, based on a user's level of confidence, a high level of confidence may be required. With a high level of confidence, the initial configuration signature consists of an image of all the descriptors captured when the I/O device was first discovered, i.e., each characteristic of the current configuration signature should explicitly match each of the characteristics of the descriptor set initially captured for by the initial configuration signature. This high-level approach may require many K-bytes of storage for each initial configuration signature. Further, the user may implement a lower level of confidence where only a certain percentage of the configuration descriptors should match the configuration signature, or the configuration signature is computed as a hash-tag, a checksum, or another value that minimizes the initial configuration signature storage requirements.

If the configuration signature and the configuration descriptors match, this may indicate that the configuration descriptors of the I/O device have not been modified since the initial connection of the I/O device to the host. At block 316, the host may load the appropriate class drivers in order to control the I/O device during use in response to the match. At block 318, the I/O device may be enabled and considered available for applications of the host to access.

Conversely, if the configuration signature and the configuration descriptors do not match at block 314, it is possible that the configuration descriptors of the I/O device have been modified since the initial connection of the I/O device to the host. At block 320, a notification in response to the modification to the I/O device may be presented to the user. In examples, the notification can be a description of the modification. In other embodiments, notification may be an alert or an interrupt at the host. At block 322, the user may either accept or decline the modified I/O device. If the modified I/O device is accepted, then the method updates the initial configuration signature to match the characteristics of the modified I/O device, and proceeds to blocks 316 and 318, as previously described. The method may replace the original initial configuration signature with the configuration signature of the modified I/O device or both signatures may be stored. If the modified I/O device is declined by the user, the modified I/O device is disabled at block 310, as previously described, and its configuration signature is recorded as that of a disabled device.

Figure 3B:
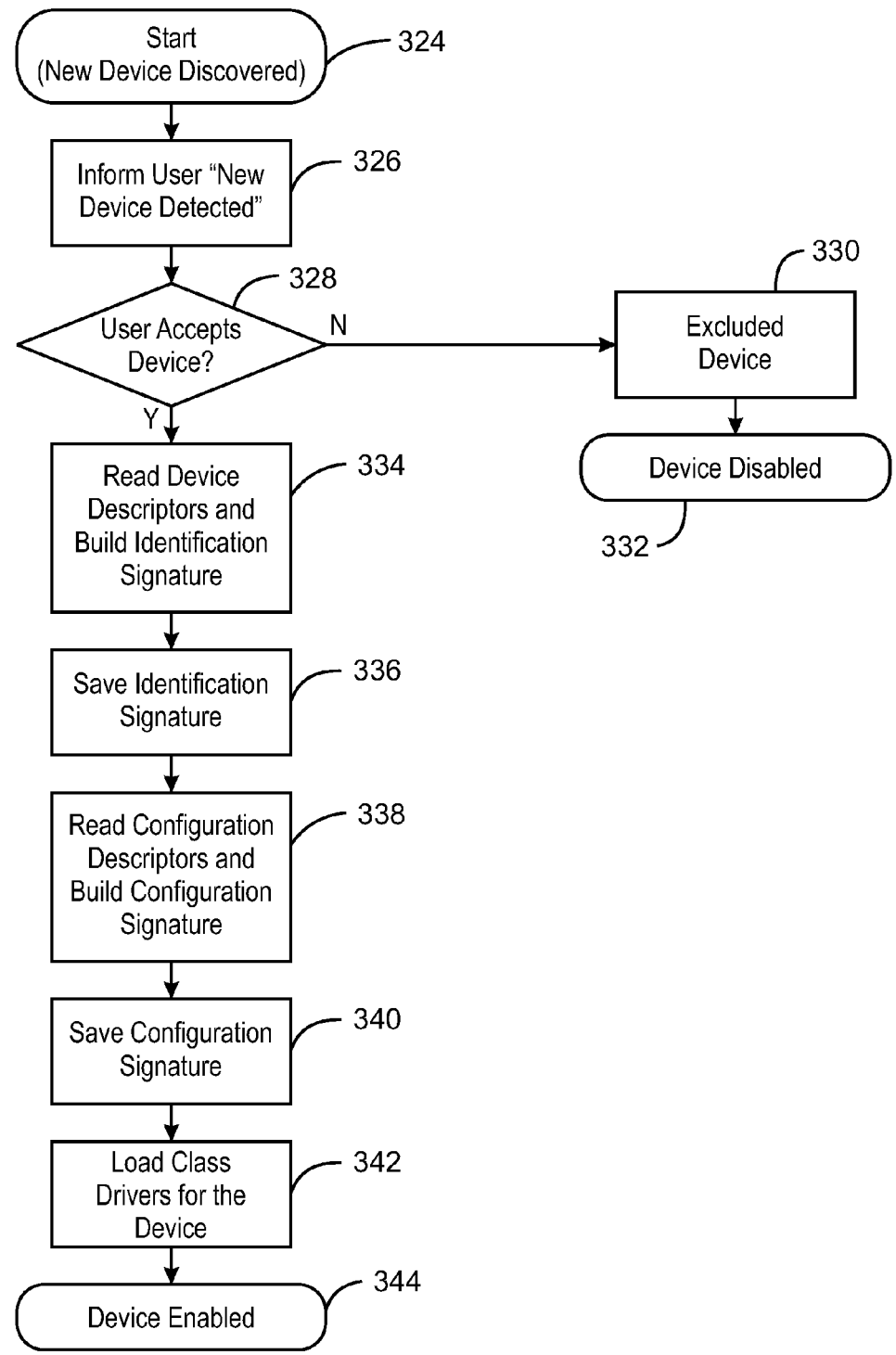
FIG. 3B is an embodiment of a process flow diagram to indicate a status of a newly discovered I/O device.

FIG. 3B is an embodiment of a process flow diagram to indicate a status of a newly discovered I/O device. In some cases, the I/O is a new device that has not been previously connected to the host. Thus, on an initial connection of the I/O device to the host, an identification signature and a configuration signature to match the descriptors of the I/O device may not be available. At block 324, upon the initial connection, the I/O device may be presented as a new device to the host. Accordingly, at block 326, a user may be informed of the new I/O device, i.e., no previous discovery. At block 328, the user may either accept or decline the new I/O device. If the new I/O device is declined, at block 330, the host may determine whether the new I/O is an excluded device. If the new I/O device is identified as an excluded device, then at block 332, the excluded I/O device may be disabled, and its configuration signature is recorded as that of a disabled device.

In the event that the user accepts the new I/O device, at block 334, the host may read the device descriptors of the new I/O device and build an identification signature based on the device descriptors. At block 336, the identification signature is saved to the host, for example, at a storage location of the host.

At block 338, the host may read the configuration descriptors of the new I/O device and build a configuration signature based on the configuration descriptors. In some embodiments, the host may store an image of the descriptors or use the descriptors to build the configuration signature. An algorithm, for example, a checksum or hash-tag value, may be used to build the configuration signature. For example, the descriptors (e.g., configuration descriptors, other types of descriptors) can be implemented in the algorithm to build a configuration signature hash tag or a configuration signature checksum. At block 340, the configuration signature is saved to the host, along with the identification signature in the storage location. At block 342, the host may load the appropriate class drivers in order to control the new I/O device during usage. At block 344, after the drivers are loaded, the new I/O device may be enabled and considered available for applications of the host to access.

It is understood that the systems of FIGS. 3A and 3B are for illustrative purposes only. For example, the components of FIGS. 3A and 3B may include any suitable number of additional operations or may include fewer operations depending on the particular application. For example, the device and configuration descriptors could be combined to form a single signature for a device.

Figure 4:
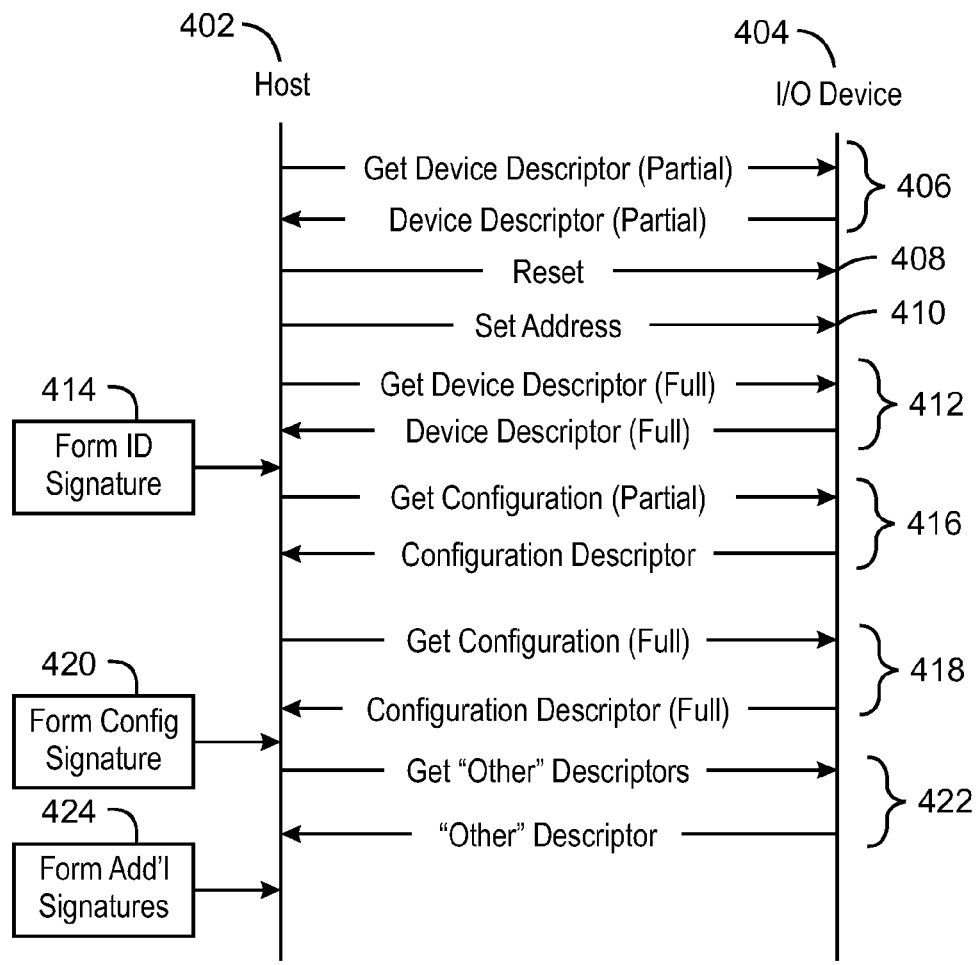
FIG. 4 is a ladder diagram for a sequence of communication events between a host and an I/O device during a discovery process.

FIG. 4 is a ladder diagram 400 for a sequence of communication events between a host 402 and an I/O device 404 during the discovery process. Specifically, FIG. 4 describes an example sequence of communication events, i.e., bus transactions, carried out between the host 402 and the I/O device 404, after an initial connection between the host 402 and the I/O device 404. The communication events of FIG. 4 include a series of requests associated with a process to identify the I/O device 404 in order for the host 402 to learn the capabilities of the device 404 and to load the appropriate drivers. In some embodiments, the host 402 may be connected to more than one I/O device and the discovery process will be performed independently for each I/O device. Additionally, operations that effect the generation of the bus transactions may occur outside of the bus transactions.

As depicted at communication event 406, the host 402 may request the I/O device 404 for details, for example, in the form of a "Get Device Descriptor (partial)" request and the I/O device 404 may return a "Device Descriptor (partial)". The communication event 406 is a request by the host 402 to determine the control endpoint (EP) maximum packet size of the I/O device 404. In some embodiments, the maximum packet size for control endpoints of the I/O device 404 may be only eight bytes for low-speed devices, and the host 402 is required to manage transfers to the I/O device 404 in no larger than maximum packet size transactions. Thus, the host 402 may request details about the I/O device 404 by requesting a "partial" request of the minimum USB packet size, e.g., eight bytes, that the I/O device 404 can process. Based on the "Get Device Descriptor (partial)" request, the first eight bytes of the device descriptor may be exchanged between the I/O device 404 and the host 402. When the packet size of the control endpoint is known, as defined by the eighth byte of the device descriptor, an additional "Get Device Descriptor (Full)" request is needed in order for the host 402 to receive a complete device descriptor from the I/O device 404, as will be later discussed.

At communication event 408, the host 402 may send a "Reset" request to the I/O device 404. The "Reset" request may be implemented in order for the host 402 to start in a known state at the end of communication event 406. In some aspects, until the I/O device 404 is reset, the host 402 may prevent the sending of data to the device 404. At communication event 410, the host 402 may send a "Set Address" request to the I/O device 404, along with a unique address for the device 404 at address zero. After the communication event 410 is complete, the I/O device 404 assumes a new address.

Due to a "partial" request 406, another "Get Device Descriptor (Full)" request is generated, at communication event 412, to obtain a complete device descriptor from the I/O device 404. At communication event, the I/O device 404 may respond by sending "Device Descriptor (full)" with a complete device descriptor. When connected to a high-speed I/O device, e.g., sixty-four bytes, the host 402, in some embodiments, may request only one "Get Device Descriptor (full)" request. In this case, the full amount of device descriptor data, e.g., eighteen bytes, may be exchanged between the I/O device 404 and the host 402 in a single packet. As a result of the previous bus transactions, the host 402 may form an identification signature related to the device descriptors via operation 414.

At communication event 416, the host 402 may request a "Get Configuration (partial)" request and the I/O device 404 may return only the first "Configuration Descriptor" based on the configuration of the device 404. The first Configuration Descriptor of the set of descriptors returned by a "Get Configuration (partial)" request identifies the total size of the configuration information available from a device 404. At communication event 418, a "Get Configuration (full)" request may be requested by the host 402 and a "Configuration Descriptor (full)" may be returned by the I/O device 404 to provide all of the related interface, endpoint, and other descriptors related to the I/O device 404. At operation 420, a configuration signature related to the configuration descriptors may be formed by the host 402 based on the communication events 416 and 418.

At communication event 422, various other descriptors may be requested by the host 402 including string descriptors, class-specific descriptors, and vendor-specific descriptors. Accordingly, at operation 424, additional signatures associated with the other retrieved descriptors may be created by the host 402. Some embodiments may combine results of communication events 412, 416, and 422 to create a single signature for the I/O device 404 or combine the results of events 412, 416, and 422 to minimize the number of signatures required per I/O device 404.

In the present embodiments, the configuration signature formed at the operation 420 may be compared against the configuration descriptors returned at communication events 416 and 418. The sequence of communications presented in FIG. 4 may be used to determine during a subsequent connection, whether a previously connected USB has been modified.

It is understood that the example of the ladder diagram of FIG. 4 is for illustrative purposes only. The components of FIG. 4 may include any suitable number of additional operations or may include fewer operations depending on the particular application.

Figure 5:
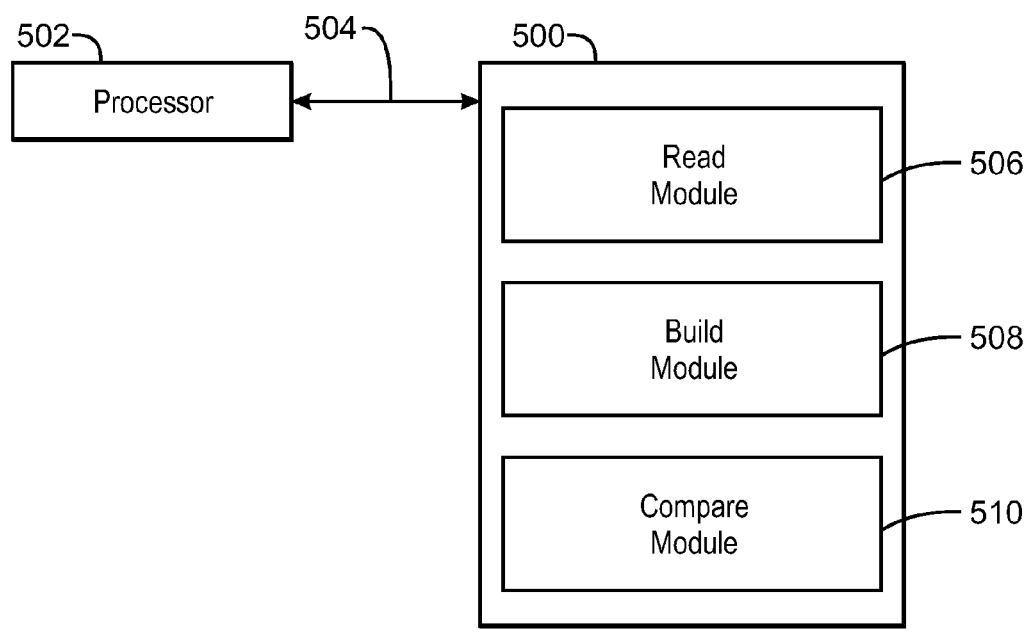
FIG. 5 is a block diagram of an example of a non-transitory, computer readable medium to indicate a status of an I/O device.

FIG. 5 is a block diagram of an example of a non-transitory, computer readable medium to indicate a status of an I/O device. The non-transitory, computer readable medium 500 may be accessed by a processor 502 over a system bus 504. Further, the non-transitory, computer readable medium 500 may include code to direct the processor 502 to perform operations of the current method.

The various software components, i.e., modules, discussed herein may be stored on the non-transitory, computer readable medium 500, as indicated in FIG. 5. In particular, the various modules may be implemented in hardware state machines. As shown in FIG. 5, a read module 506 may be adapted to read descriptors of a device, e.g., I/O device, at a host. In some embodiments, a build module 508 may be adapted to direct the processor 502 to build a configuration signature from the descriptors in response to an initial connection of the device to a host. In some embodiments, a compare module 510 may be adapted to compare descriptors of the device to the configuration signature to determine if a modification to the device has occurred after the initial attachment of the device to the host.

It is to be understood that any suitable number of the software components shown in FIG. 5 may be included within the non-transitory, computer readable medium 500. Furthermore, any number of additional software components not shown in FIG. 5 may be included within the non-transitory, computer readable medium 500, depending on the specific application.

Example 1

A method is described herein. The method includes reading descriptors of the I/O device at a host. The method includes building a configuration signature from the descriptors in response to a connection between the I/O device and the host. The method includes comparing the descriptors of the I/O device to the configuration signature to determine if a modification to the I/O device has occurred after an initial connection of the I/O device to the host. The configuration signature includes a power-up feature, a status setting, a class specific setting, among other types of settings specific to the I/O device. The descriptors of the I/O device include device descriptors, configuration descriptors, string descriptors, interface descriptors, class-specific descriptors, vendor-specific descriptors, and endpoint descriptors, among other descriptors described by USB specifications.

The method includes comparing the descriptors of the I/O device to the configuration signature determines whether the descriptors of the I/O device match the configuration signature. The method includes generating a notification in response to the modification of the I/O device, wherein the notification comprises a description of the modification. The method includes generating an indication to a user to accept or decline the modification to the I/O device. The method includes accepting the modification to the I/O device, loading drivers for the I/O device onto the host, and enabling the I/O device for use by the host. The method includes declining the modification to the I/O device and disabling the I/O device to prevent use by the host.

The method includes storing the configuration signature and an identification signature in a storage location of the host, wherein the identification signature is formed from the descriptors of the I/O device. The method includes storing the configuration signature as multiple sub-signatures in a storage location of the host, where the sub-signatures are formed from subset of the descriptors, others states of the I/O device, or a combination of both. The I/O device may be a Universal Serial Bus (USB) device or a vendor-defined device, where descriptors of the USB device and vendor-defined device class are compared with the configuration signature. The I/O device may be a human interface device (HID) and wherein HID descriptors are compared with the configuration signature to determine if a modification to the HID has occurred after an initial connection of the HID to the host.

Example 2

A system is described herein. The system includes a device, where descriptors are stored on the device and a host, where the device was previously connected to the host. The host includes a build mechanism configured to build a configuration signature on the host, where the descriptors are used to build the configuration signature. The host includes a comparison mechanism configured to compared the descriptors stored on the device with the configuration signature on the host and to determine if a modification to the device has occurred. The host includes a notification mechanism configured to generate a notification in response to the modification to the device. The host includes an indication mechanism configured to generate an indication to a user to accept or decline the modification to the device. The host includes storage to store the configuration signature and an identification signature, where the identification signature is formed from the descriptors stored on the device. The host includes an exclusion mechanism including of a list of excluded devices, where the device is checked to determine if it is an excluded device, and where an excluded device is disabled when connected to the host. The notification in response to the modification of the device includes a description of the modification. Further, the decline of the modification to the device renders the device disabled when connected to the host.

Example 3

A non-transitory, computer readable medium to determine the status of an input/output (I/O) device including code to direct a processor is described herein. The non-transitory, computer readable medium includes code to direct a processor to read descriptors of the I/O device. The non-transitory, computer readable medium includes code to direct the processor to build a configuration signature from the descriptors in response to a connection of the I/O device to a host. The non-transitory, computer readable medium includes code to direct the processor to compare descriptors of the I/O device to the configuration signature to determine if a modification to the I/O device has occurred after an initial connection of the I/O device to the host.

The non-transitory, computer readable medium includes code to direct the processor to store the configuration signature and an identification signature. The non-transitory, computer readable medium includes code to direct the processor to determine whether the I/O device is an excluded device and to disable the excluded device. The non-transitory, computer readable medium includes code to direct the processor to generate a notification in response to the modification to the I/O device and to indicate an acceptance or decline of the modification to the I/O device. Further, the I/O device is a human interface device (HID), wherein the descriptors are HID descriptors, and wherein the HID descriptors reference a report descriptor. The non-transitory, computer readable medium includes code to direct the processor to compare the HID descriptors to the configuration signature to determine if a modification to the HID has occurred after a connection of the HID device to the host. The I/O device is disabled for use after the indication of a decline of the modification to the I/O device. The I/O device is enable for use after the indication of an acceptance of the modification to the I/O device.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. As can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method, comprising:
reading descriptors of an input/output (I/O) device at a host;
building a configuration signature and an identification signature from the descriptors in response to a connection between the I/O device and the host, wherein the identification signature comprises vendor identification and device identification and the identification signature is built upon an initial connection of the I/O device, and further wherein the configuration signature is built via static descriptors;
determining, via the identification signature, if the I/O device has been previously attached;
storing the configuration signature and the identification signature in response to the device not being previously attached; and
comparing the descriptors of the I/O device to the configuration signature in response to the I/O device being previously attached to determine if a modification to the I/O device has occurred after an initial connection of the I/O device to the host, wherein a modification has occurred if the static descriptors have been modified; and
quarantining the I/O device in response to a modified static descriptor.

2. The method of claim 1, wherein the configuration signature comprises each of a power-up feature, a status setting, and a class specific setting.

3. The method of claim 1, wherein the comparing the descriptors of the I/O device to the configuration signature determines whether the descriptors of the I/O device match the configuration signature.

4. The method of claim 1, comprising generating a notification in response to the modification of the I/O device, wherein the notification comprises a description of the modification.

5. The method of claim 1, comprising generating an indication to a user to accept or decline the modification to the I/O device.

6. The method of claim 1, comprising:
accepting the modification to the I/O device;
loading drivers for the I/O device onto the host; and
enabling the I/O device for use by the host.

7. The method of claim 1, comprising
declining the modification to the I/O device; and
disabling the I/O device to prevent use by the host.

8. The method of claim 1, wherein the descriptors of the I/O device comprise device descriptors, configuration descriptors, string descriptors, interface descriptors, class-specific descriptors, vendor-specific descriptors, and endpoint descriptors.

9. The method of claim 1, wherein the I/O device is a human interface device (HID) and wherein the descriptors comprise one or more HID class defined descriptors that are compared with the configuration signature to determine if a modification to the HID has occurred after an initial connection of the HID to the host.

10. The method of claim 1, wherein the I/O device comprises a Universal Serial Bus (USB) device or a vendor-defined device, wherein the respective descriptors of the USB device or the vendor-defined device are compared with the configuration signature.

11. The method of claim 1, comprising storing the configuration signature as multiple sub-signatures in a storage location of the host, wherein the sub-signatures are formed from a subset of the descriptors, a plurality of states of the I/O device, or a combination of both.

12. A system comprising:
a device, wherein descriptors are stored on the device;
a memory that is to store instructions and that is communicatively coupled to the device;
a processor communicatively coupled to the device and the memory, wherein when the processor is to execute the instructions, the processor is to:
build a configuration signature on a host, wherein static descriptors are used to build the configuration signature via a checksum or hash value algorithm and an identification signature is built upon an initial connection of the device;
determine, via the identification signature, if the device has been previously attached;
store the configuration signature and the identification signature in memory in response to the device not being previously attached;
compare the descriptors stored on the device with the configuration signature on the host in response to the device being previously attached and to determine if a modification to the device has occurred after an initial connection of the device to the host, wherein a modification has occurred if the static descriptors have been modified; and
quarantining the I/O device in response to a modified static descriptor.

13. The system of claim 12, wherein the host comprises storage to store the configuration signature and the identification signature, wherein the identification signature is formed from the descriptors stored on the device.

14. The system of claim 12, wherein a notification in response to the modification of the device comprises a description of the modification.

15. The system of claim 12, wherein a decline of the modification to the device renders the device disabled when connected to the host.

16. A non-transitory, computer readable medium to determine the status of an input/output (I/O) device comprising code to direct a processor to:
read static descriptors of the I/O device;
build a configuration signature and an identification signature from the static descriptors in response to a connection of the I/O device to a host, wherein the configuration signature is a direct image of the static descriptors and the identification signature comprises vendor identification and device identification, and the identification signature is built upon an initial connection of the I/O device;
determine, via the identification signature, if the I/O device has been previously attached;
store the configuration signature and the identification signature in response to the I/O device not being previously attached; and
compare the static descriptors of the I/O device to the configuration signature in response to the I/O device being previously attached to determine if a modification to the I/O device has occurred after an initial connection of the I/O device to the host, wherein a modification has occurred if the static descriptors have been modified; and
quarantining the I/O device in response to a modified static descriptor.

17. The non-transitory, computer readable medium of claim 16, comprising code to direct the processor to:
store the configuration signature and an identification signature.

18. The non-transitory, computer readable medium of claim 16, comprising code to direct the processor to:
determine whether the I/O device is an excluded device; and
disable the excluded device.

19. The non-transitory, computer readable medium of claim 17, comprising code to direct the processor to:
generate a notification in response to the modification to the I/O device; and
indicate an acceptance or decline of the modification to the I/O device.

20. The non-transitory, computer readable medium of claim 19, wherein the I/O device is disabled for use after the indication of a decline of the modification to the I/O device.

21. The non-transitory, computer readable medium of claim 19, wherein the I/O device is enabled for use after the indication of an acceptance of the modification to the I/O device.

22. The non-transitory, computer readable medium of claim 16, wherein the I/O device is a human interface device (HID), wherein the descriptors are HID descriptors, and wherein the HID descriptors reference a report descriptor.

23. The non-transitory, computer readable medium of claim 22, comprising code to direct the processor to:
compare the HID descriptors to the configuration signature to determine if a modification to the HID has occurred after a connection of the HID device to the host.

* * * * *